(12) United States Patent  (10) Patent No.: US 9,345,969 B2
Lin et al.  (45) Date of Patent: May 24, 2016

(54) GAME JOYSTICK

(71) Applicant: Cheng Uei Precision Industry Co., Ltd., New Taipei (TW)

(72) Inventors: Sheng Yuan Lin, New Taipei (TW); Tsung Shih Lee, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/447,543

(22) Filed: Jul. 30, 2014

(65) Prior Publication Data

US 2016/0030837 A1    Feb. 4, 2016

(51) Int. Cl.
 *A63F 13/06*  (2006.01)
 *A63F 13/24*  (2014.01)
(52) U.S. Cl.
 CPC ..................................... *A63F 13/24* (2014.09)
(58) Field of Classification Search
 USPC .......................................................... 463/38
 See application file for complete search history.

(56) References Cited

U.S. PATENT DOCUMENTS

| 2013/0166332 A1* | 6/2013 | Hammad | G07B 13/00 705/5 |
| 2015/0309316 A1* | 10/2015 | Osterhout | G06F 1/163 345/8 |

* cited by examiner

*Primary Examiner* — Pierre E Elisca
(74) *Attorney, Agent, or Firm* — Cheng-Ju Chiang

(57) ABSTRACT

A game joystick adapted for being operated by optical finger navigator includes a body, a main circuit board assembled inside the body, at least one operation interface mounted in the top of the body and exposed through a top face of the body to be substantially flush with the top face of the body, and at least one detective control unit mounted on the main circuit board inside the body and electrically connected to the main circuit board. The operation interface is located over the detective control unit. The detective control unit emits light to the bottom of the operation interface and further captures fingerprint information through the operation interface under the action of the light while moving a finger on the operation interface. The fingerprint information is further processed and converted into operation commands by the detective control unit and then the operation commands are sent out.

9 Claims, 6 Drawing Sheets

GAME JOYSTICK

BACKGROUND OF THE INVENTION

1. Field of the Invention

The present invention relates to a game joystick having a high accuracy and a small body size.

2. The Related Art

Referring to FIG. 1, a traditional game joystick 100' includes a body 10' equipped with a direction key 11', a plurality of function keys 12' and a pair of analog sticks 13' in the top thereof. A top face of the body 10' protrudes upward to form a pair of bumps 101'. A center of each bump 101' is concaved downward to form a mounting hole 102'. The analog sticks 13' are respectively assembled in the mounting holes 102' and the free ends of the analog sticks 13' are projected beyond the top face of the body 10'. Further, the analog sticks 13' are able to rotate in 360 degrees to control the direction of the game in use.

However, the analog sticks 13' of the traditional game joystick 100' are projected at a distance beyond the top face of the body 10' and it causes a thick thickness and a great bulk of the game joystick 100'. Furthermore the accuracy of the analog sticks 13' of the traditional game joystick 100' is low. So, it is inconvenient for the users to operate the traditional game joystick 100'.

SUMMARY OF THE INVENTION

Accordingly, an object of the present invention is to provide a game joystick adapted for being operated by optical finger navigator. The game joystick includes a body, a main circuit board assembled inside the body, at least one operation interface mounted in the top of the body and exposed through a top face of the body to be substantially flush with the top face of the body, and at least one detective control unit mounted on the main circuit board inside the body and electrically connected to the main circuit board. The operation interface is located over the detective control unit. The detective control unit emits light to the bottom of the operation interface and further captures fingerprint information through the operation interface under the action of the light while moving a finger on the operation interface. The fingerprint information is further processed and converted into operation commands by the detective control unit and then the operation commands are sent out.

As described above, the embodiment of the invention of the game joystick utilizes the operation interface and the detective control unit instead of the analog stick in the prior art. The accuracy is higher than the traditional game joystick in the prior art and the thickness is so thin that the body size is smaller. It is convenient for the users to operate the game joystick.

BRIEF DESCRIPTION OF THE DRAWINGS

The present invention will be apparent to those skilled in the art by reading the following description thereof, with reference to the attached drawings, in which.

DETAILED DESCRIPTION OF THE EMBODIMENT

Figure 1:
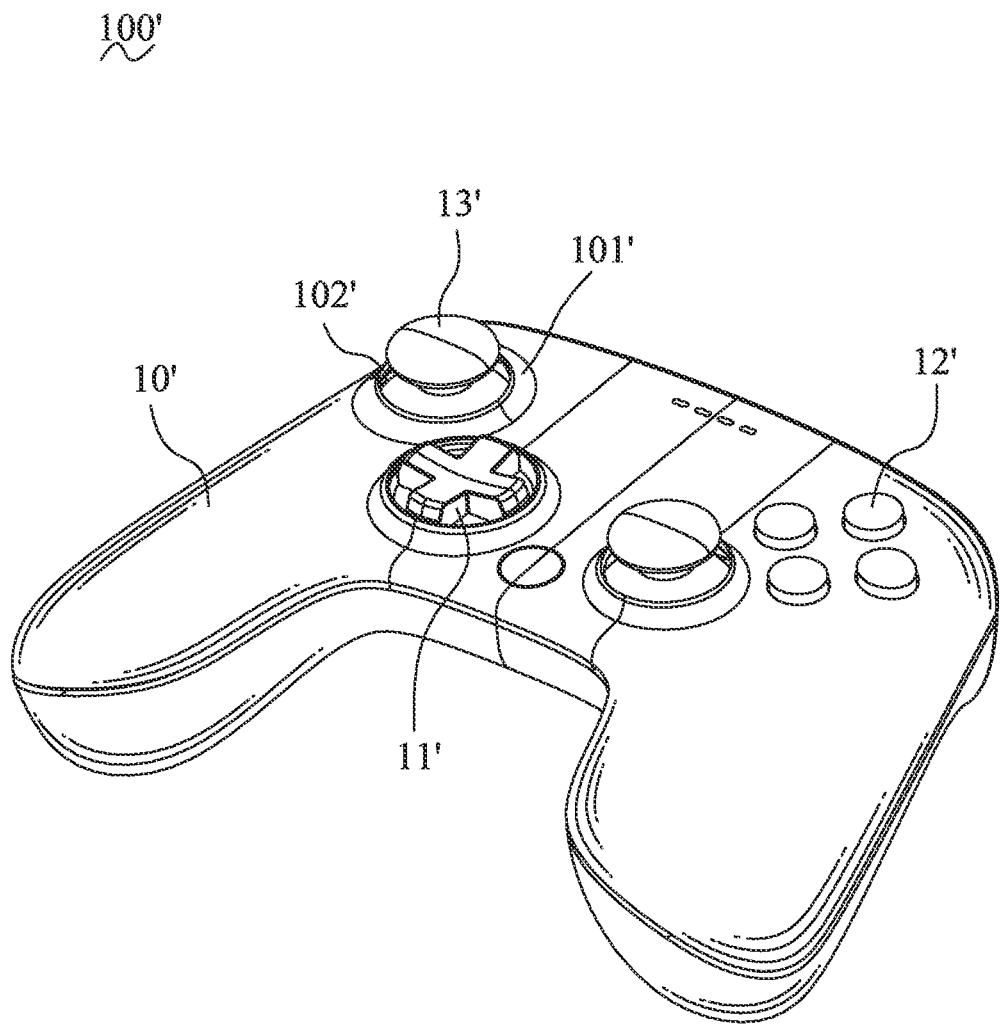
FIG. 1 is an assembled, perspective view of a traditional game joystick.

With reference to FIGS. 2 to 6, an embodiment of the present invention is shown as a game joystick 100 which is operated by virtue of optical finger navigator (OFN). The game joystick 100 includes a hollow body 10, a main circuit board 20 assembled inside the body 10, at least two detective control units 30 mounted on the main circuit board 20 inside the body 10 and electrically connected to the main circuit board 20, at least two operation interfaces 40 mounted in the top of the body 10 and located over the detective control units 30 respectively, a wireless transmitter 50 and a power switch 60.

Figure 2:
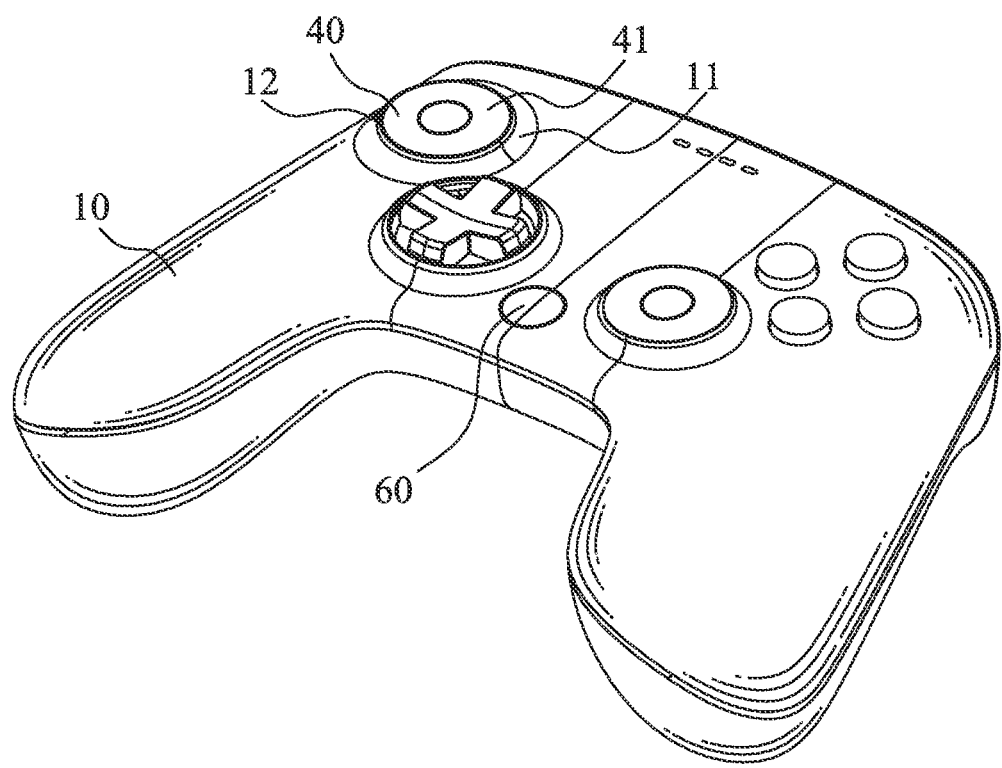
FIG. 2 is an assembled, perspective view of a game joystick in accordance with an embodiment of the present invention.

Referring to FIG. 2, a top face of the body 10 protrudes upward to form at least two circular bumps 11. A center of each bump 11 is concaved downward to form a mounting hole 12.

Figure 3:
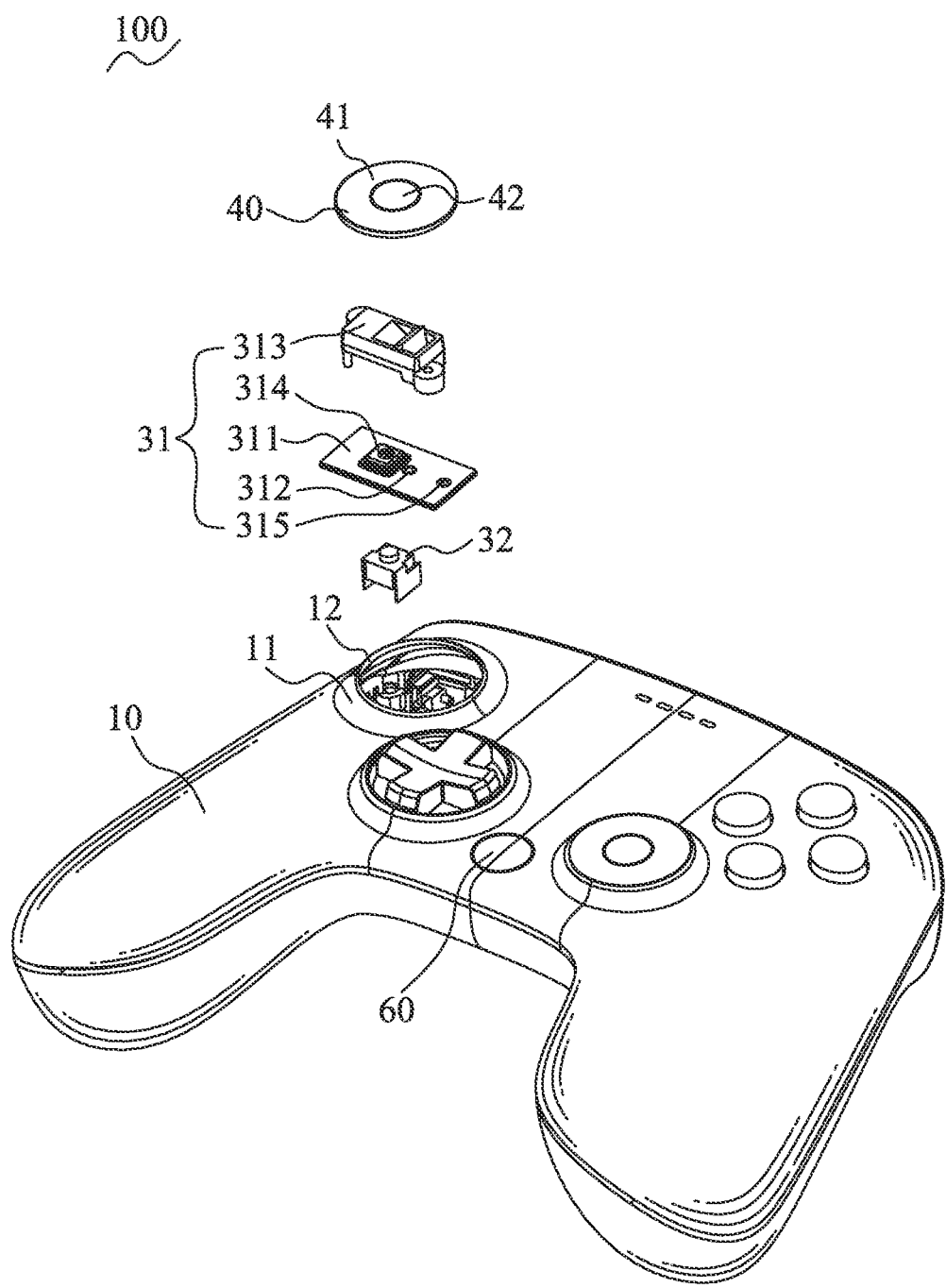
FIG. 3 is a partially exploded, perspective view of the game joystick shown in FIG. 2.

Referring to FIG. 2 and FIG. 3, the operation interfaces 40 are mounted in and exposed through the mounting holes 12 of the body 10 respectively. Top faces of the operation interfaces 40 and the body 10 are substantially flush with each other. Each of the operation interfaces 40 is substantially of flat disc shape, and defines a through hole 42 in the center thereof. The rest part of the operation interface 40 excluding the through hole 42 is acted as a mechanical interface 41.

Referring to FIGS. 3 to 6, each of the detective control units 30 includes an image capture module 31, a push switch 32, an A/D (Analog to Digital) converter 33, a CPU (Central Processing Unit) 34 and a storage module 35, wherein the image capture module 31, the push switch 32, the A/D converter 33 and the storage module 35 are electrically connected with the CPU 34.

The image capture module 31 includes a sub circuit board 311, a light-emitting component 312, a lens 313 and a photosensitive module 314. The sub circuit board 311 is located above the main circuit board 20 and electrically connected to the main circuit board 20. The lens 313 is mounted upon the sub circuit board 311 and located under the operation interface 40. The light-emitting component 312 and the photosensitive module 314 are disposed on the sub circuit board 311 and located under the lens 313. The light-emitting component 312 and the photosensitive module 314 substantially face the through hole 42 of the operation interface 40 via the lens 313, whereby the image capture module 31 can detect all actions of moving a finger on the through hole 42 of the operation interface 40 to control a cursor on an external screen.

In detail, the light-emitting component 312 of the image capture module 31 emits a light to the bottom of the operation interface 40 through the lens 313. When moving the finger on the through hole 42 of the operation interface 40, the photosensitive module 314 captures fingerprint information through the through hole 42 and the lens 313 under the action of the light, and then transmits the fingerprint information to the A/D converter 33 via the CPU 34. The A/D converter 33 converts the fingerprint information from analog signals to digital signals. Further, the digital signals are transmitted to the CPU 34 of the detective control unit 30 and then are processed and converted into operation commands by the CPU 34, such as movement, rotation and position. Then the operation commands are sent out to control the cursor on the external screen.

At the same time, the fingerprint information of the user captured by the image capture module 31 of the detective control unit 30 is further transmitted to the storage module 35 via the CPU 34 to save the fingerprint information of the user into the storage module 35. Thus, different users can storage personal fingerprint information to the game joystick 100 and even set personal game habit. When use the game joystick 100 again, the user can read the personal setting through the stored fingerprint information before.

Figure 4:
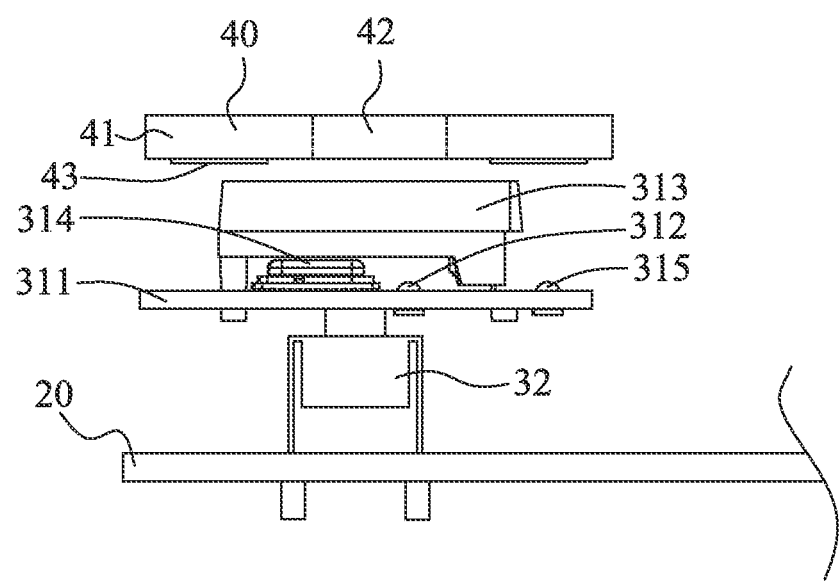
FIG. 4 is one embodiment of the assembly of an operation interface, a detective control unit and a main circuit board of the game joystick shown in FIG. 2.
Figure 5:
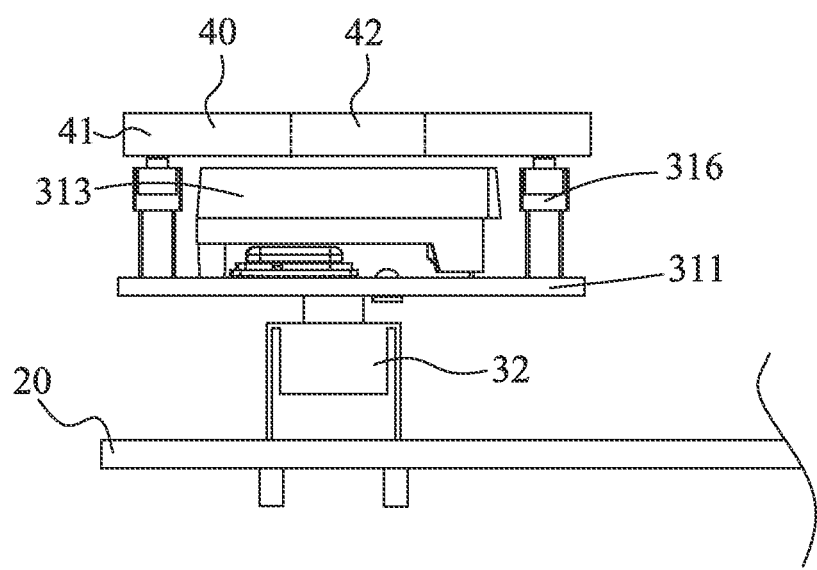
FIG. 5 is another embodiment of the assembly of an operation interface, a detective control unit and a main circuit board of the game joystick shown in FIG. 2.

Referring to FIG. 3, FIG. 4 and FIG. 5, in this invention, the operation interfaces 40 can be designed with the same function or slightly different functions selected from finger slide thereon & mechanical rotation thereof (shown in FIG. 4) and finger slide thereon & mechanical keys thereof (shown in FIG. 5). Accordingly, the image capture modules 31 cooperating with the corresponding operation interfaces 40 can be designed with slightly different structures according to the slightly different functions of the operation interfaces 40. In detail, the image capture module 31 and the operation interface 40 are described as follows.

Referring to FIG. 4, if the operation interface 40 is designed with the function combining the finger slide thereon and the mechanical rotation thereof, a scale indication 43 is provided on a bottom face of the mechanical interface 41 of the operation interface 40, and a top face of the mechanical interface 41 is rough for the convenience of mechanically rotating the operation interface 40 clockwise or anticlockwise by driving friction of the finger acting on the mechanical interface 41. Accordingly, the image capture module 31 further includes a photo reflector 315 disposed on the sub circuit board 311 and located under the scale indication 43 of the mechanical interface 41 for detecting rotation angle of the operation interface 40 by sensing the scale indication 43. In other embodiment, the photo reflector 315 can be replaced by another unitary image capture module 31.

Referring to FIG. 5, if the operation interface 40 is designed with the function combining the finger slide thereon and the mechanical keys thereof, the image capture module 31 further includes at least four keys 316 mounted on the sub circuit board 311 and located at regular intervals under the mechanical interface 41 of the operation interface 40. Accordingly, the mechanical interface 41 of the operation interface 40 has at least four positions corresponding to the keys 316 capable of being pressed downward to touch the corresponding keys 316 so as to realize more functions.

Referring to FIG. 4 and FIG. 5 again, the push switch 32 is mounted on the main circuit board 20 and electrically connected with the main circuit board 20. A top end of the push switch 32 is against a bottom face of the sub circuit board 311 of the detective control unit 30. The push switch 32 can be actuated by pressing the finger downward at the through hole 42 of the operation interface 40 to switch the game joystick 100 to another operation mode. So, in this invention, the operation interface 40 can work in two modes to provide more functions for the game joystick 100 and effectively reduce the number of mechanism keys and a body size of the game joystick 100.

Figure 6:
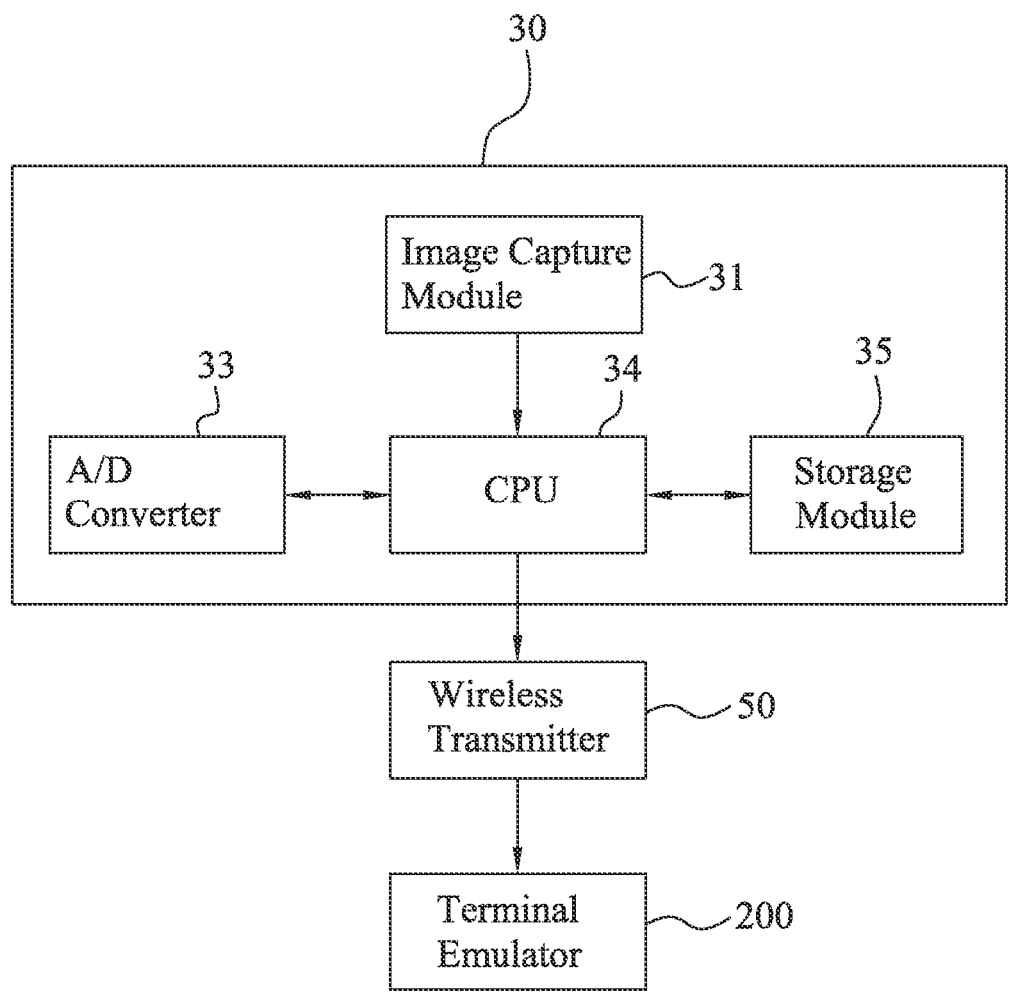
FIG. 6 is a block diagram of a connection of the game joystick of FIG. 2 and an external terminal emulator.

Referring to FIG. 6, the wireless transmitter 50 is electrically connected with the detective control unit 30 for receiving the operation commands from the CPU 34 of the detective control unit 30 and then sending out the operation commands to an external terminal emulator 200. The embodiment of the invention of the image capture module 31 of the detective control unit 30 can deal with images of more pixels, so the game joystick 100 has a higher accuracy.

Referring to FIG. 2 and FIG. 3, the power switch 60 is mounted in the top of the body 10 and exposed through the top face of the body 10. The power switch 60 is electrically connected to the main circuit board 20 to power on/off the game joystick 100.

As described above, the embodiment of the invention of the game joystick 100 utilizes the operation interface 40 and the detective control unit 30 instead of the analog sticks 13' in the prior art. The accuracy is higher than the traditional game joystick 100' and the thickness is so thin that the body size is smaller. It is convenient for the users to operate the game joystick 100.

What is claimed is:

1. A game joystick adapted for being operated by optical finger navigator, comprising:
    a body;
    a main circuit board assembled inside the body;
    at least one operation interface mounted in the top of the body and exposed through a top face of the body to be substantially flush with the top face of the body; and
    at least one detective control unit mounted on the main circuit board inside the body and electrically connected to the main circuit board;
    wherein the operation interface is located over the detective control unit, the detective control unit emits light to the bottom of the operation interface and further captures fingerprint information through the operation interface under the action of the light while moving a finger on the operation interface, the fingerprint information is further processed and converted into operation commands by the detective control unit and then the operation commands are sent out;
    wherein the detective control unit includes an image capture module, an analog-to-digital (A/D) converter and a central processing unit (CPU), the image capture module and the A/D converter are electrically connected with the CPU, the image capture module captures the fingerprint information through the operation interface and then transmits the fingerprint information to the A/D converter via the CPU, the A/D converter converts the fingerprint information from analog signals to digital signals, then the CPU processes and converts the digital signals into the operation commands.

2. The game joystick as claimed in claim 1, wherein the detective control unit further includes a storage module electrically connected with the CPU, the image capture module of the detective control unit captures the fingerprint information of a user and further transmits the fingerprint information to the storage module via the CPU to save the fingerprint information of the user into the storage module.

3. The game joystick as claimed in claim 1, wherein the image capture module includes a sub circuit board, a light-emitting component emitting the light, a lens and a photosensitive module, the sub circuit board is located above the main circuit board and electrically connected to the main circuit board, the lens is mounted upon the sub circuit board and located under the operation interface, the light-emitting component and the photosensitive module are disposed on the sub circuit board and located under the lens, the light from the light-emitting component passes through the lens to the bottom of the operation interface, then the photosensitive module captures the fingerprint information through the lens and the operation interface under the action of the light.

4. The game joystick as claimed in claim 3, wherein the top face of the body protrudes upward to form at least one bump, a center of the bump is concaved downward to form a mounting hole, the operation interface is mounted in and exposed through the mounting hole of the body, the operation interface is substantially of flat disc shape and defines a through hole in the center thereof, the rest part of the operation interface excluding the through hole is acted as a mechanical interface, the light-emitting component and the photosensitive module of the image capture module substantially face the through hole of the operation interface via the lens, the photosensitive module captures the fingerprint information through the through hole of the operation interface by moving the finger on the through hole of the operation interface.

5. The game joystick as claimed in claim 4, wherein the operation interface can be designed with a function combining the finger slide thereon and a mechanical rotation thereof, a scale indication is provided on a bottom face of the mechanical interface of the operation interface, and a top face of the mechanical interface is rough for mechanically rotating the operation interface clockwise or anticlockwise by driving friction of the finger acting on the mechanical interface, the image capture module of the detective control unit further includes a photo reflector disposed on the sub circuit board and located under the scale indication of the mechanical interface for detecting rotation angle of the operation interface by sensing the scale indication.

6. The game joystick as claimed in claim 4, wherein the operation interface can be designed with a function combining the finger slide thereon and mechanical keys thereof, the image capture module of the detective control unit further includes at least four keys mounted on the sub circuit board and located at regular intervals under the mechanical interface of the operation interface, the mechanical interface of the operation interface accordingly has at least four positions corresponding to the keys capable of being pressed downward to touch the corresponding keys.

7. The game joystick as claimed in claim 4, wherein the detective control unit further includes a push switch, the push switch is mounted on the main circuit board and electrically connected with the main circuit board, a top end of the push switch is against a bottom face of the sub circuit board of the detective control unit, the push switch can be actuated by pressing the finger downward at the through hole of the operation interface to switch the game joystick to another operation mode.

8. The game joystick as claimed in claim 1, further comprising a wireless transmitter electrically connected with the detective control unit, the wireless transmitter receives the operation commands from the detective control unit and then sends out the operation commands.

9. The game joystick as claimed in claim 1, further comprising a power switch mounted in the top of the body and exposed through the top face of the body, the power switch is electrically connected to the main circuit board.

* * * * *